United States Patent [19]

Imbert et al.

[11] Patent Number: 5,134,483
[45] Date of Patent: Jul. 28, 1992

[54] AUTOMATIC CONNECTION SYSTEM ON A COLOR TV S-VHS INPUT

[75] Inventors: Michel Imbert, Seyssins; Thierry Meunier, Voreppe, both of France

[73] Assignee: SGS-Thomson Microelectronics S.A., Gentilly, France

[21] Appl. No.: 658,609

[22] Filed: Feb. 21, 1991

[30] Foreign Application Priority Data

Feb. 22, 1990 [FR] France .................. 90 02460

[51] Int. Cl.[5] .............................................. H04N 5/46
[52] U.S. Cl. ............................... 358/181; 358/21 R
[58] Field of Search ............................ 358/181, 21 R

[56] References Cited

U.S. PATENT DOCUMENTS

| | | | |
|---|---|---|---|
| 4,935,807 | 6/1990 | Sendelweck | 358/21 R |
| 4,937,672 | 6/1990 | Anderson | 358/181 |
| 4,963,958 | 10/1990 | Sendelweck | 358/21 R |
| 4,963,979 | 10/1990 | Sendelweck | 358/21 R |
| 4,996,597 | 2/1991 | Duffield | 358/181 |
| 5,032,900 | 7/1991 | Sendelweck | 358/21 R |

*Primary Examiner*—Howard W. Britton
*Attorney, Agent, or Firm*—Lowe, Price, LeBlanc & Becker

[57] ABSTRACT

An automatic connection circuit on either of the input terminals of a TV set, each of these inputs receiving video signals according to one of several standards, comprising a standard identification circuit (10) and a selection circuit (11), the identification circuit sending an inhibition signal (IN) to the selection circuit when it has detected a selected standard; a switch (14), the first terminal (12) of which is connected to the input of the identification circuit and the second terminal of which is connected to either of the input terminals by the action of a control signal (16); a divider (15) receiving a periodic signal and providing a signal for controlling the selection circuit according to a first period and the switch according to a half period, this divider being inhibited by said inhibition signal.

3 Claims, 1 Drawing Sheet

AUTOMATIC CONNECTION SYSTEM ON A COLOR TV S-VHS INPUT

BACKGROUND OF THE INVENTION

The present invention relates to color TV circuits.

There are presently several standards for the emission of color TV signals, among which the PAL, NTSC and SECAM standards.

In order to avoid settings by televiewers selecting a specific TV channel without knowing the type of standard of the signal sent on this channel, there are prior art circuits for automatically identifying standards. Under the action of a selection circuit properly conditioning the identification circuit, the latter circuit tests the signal received and, as soon as it has recognized the standard for which it has been conditioned by the selection circuit, it sends control signals to various internal circuits of the TV set for blocking them at the state corresponding to the recognized standard.

On the other hand, some TV sets are designed to receive either TV signals arriving on an antenna, or signals from a video tape recorder.

Conventionally, even though there are two input connectors, one for connecting the antenna and one for connecting the video tape recorder, these two connectors are connected to a same input terminal of the standard identification circuit.

However, nowadays, there is a tendency to develop a new standard for video tape recorder signals, called S-VHS standard. In this standard, the video signal of the video tape recorder is transmitted to the color TV set through two connections. A first cable transmits the color sub-carrier and is connected to a specific input, called S-VHS input, of the TV set. A second cable transmits the luminance and synchronization information and is connected either to the antenna input or to an other usually existing connector (SCART socket).

By separating on two wires the luminance and chrominance information of a video tape recorder, the pass-band of the luminance signal and therefore a better image definition are obtained.

However, a problem is that the signal arriving on the antenna wire no longer corresponds to any common standard and that the specific connection on which the S-VHS signal arrives is to be selected by a switch. Thus, the user will need an additional control switch for connecting the terminal of the S-VHS signal to the internal circuits of the TV set. This causes several drawbacks. On the one hand, having to actuate an additional manual switch is a constraint for the user whereas, on the contrary, color TV sets are tried to be made more and more easy to use. On the other hand, the provision of an additional manual switch increases the cost of the TV set.

Thus, an object of the invention is to provide an automatic connection of the color TV set to a S-VHS input as soon as a signal occurs on this input.

Another object of the invention is to provide such an automatic connection which increases as little as possible the complexity of the internal circuits of a TV set.

SUMMARY OF THE INVENTION

To attain these objects, for achieving the automatic connection, the invention mostly uses the circuits already existing in a color TV set.

More particularly, the invention provides an automatic connection circuit on either of two input terminals of a TV set, each of these inputs receiving video signals according to one of several standards, comprising a standard identification circuit and a selection circuit for controlling the identification circuit, the identification circuit sending an inhibition signal to the selection circuit when it has detected a signal corresponding to the type of standard for which it is selected, further comprising a switch, the first terminal of which is connected to the input of the identification circuit and the second terminal of which is connected to either of the input terminals by the action of a control signal; and a divider receiving a periodic signal and providing a signal for controlling the selection circuit according to a first period and the switch according to a half period, the operation of this divider being inhibited by said inhibition signal.

According to an embodiment of the invention, the signal sent to the divider is a TV frame retrace signal (RT).

According to an embodiment of the invention, the first input terminal is the antenna input terminal (CVBS) and the second input terminal is a S-VHS terminal.

BRIEF DISCLOSURE OF THE DRAWINGS

The foregoing and other objects, features and advantages of the invention will be apparent from the following detailed description of preferred embodiments as illustrated in the accompanying figures wherein.

DETAILED DESCRIPTION OF THE INVENTION

Figure 1:
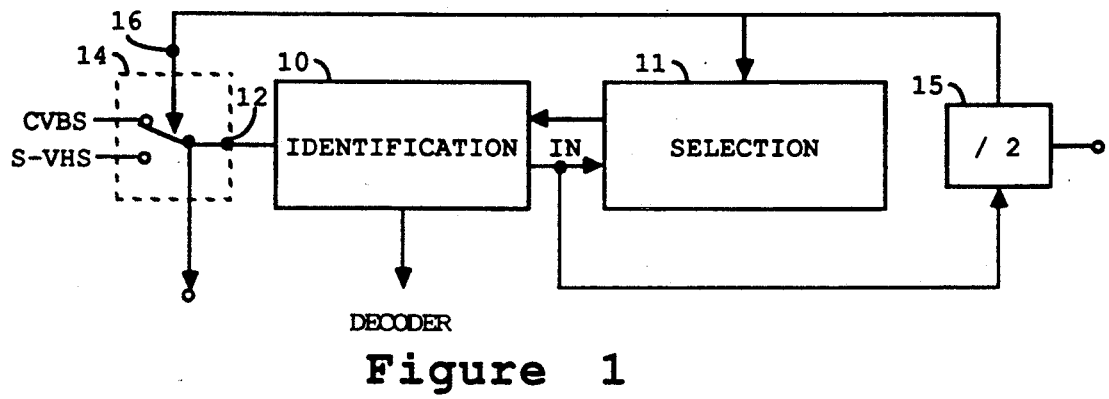
FIG. 1 is a schematic block diagram of an automatic connection circuit according to the invention.

As shown in FIG. 1, the circuit according to the invention uses a conventional standard identification circuit 10 and a conventional selection circuit 11. These circuits can be included in the TEA 5640 integrated circuit commercialized by SGS-Thomson Microelectronics. These selection and identification circuits cooperate in order, according to predetermined sequences, to place the identification circuit in a detection configuration of a first, second, then third standard. Once the identification circuit has recognized a standard, it sends an inhibition signal IN to the selection circuit to stop the search and it sends control signals to various internal circuits of the TV set in order to configure these circuits to process the signal according to the identified standard. Usually, during the search phase, the selection circuit is incremented at the frequency corresponding to the frame retract signal RT of the TV signal. Conventionally, the input terminal 12 of the identification circuit is directly connected to the input receiving the composite video signal from the antenna or the SCART socket.

The invention relates to the case when the input signal to the TV set is present either on the antenna input (CVBS) or on a specific video tape recorder input (S-VHS). To deal with this, the invention provides the addition to the prior art identification circuit of, on the one hand, an input switch 14 and, on the other hand, a divider by two 15.

The first terminal of the input switch 14 is connected to the input terminal 12 of the identification circuit 10. The second terminal of the input switch can be connected either to the CVBS input or to the S-VHS input.

Figure 2:
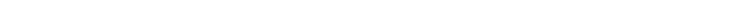
FIG. 2 shows timing diagrams intended to explain the operation of the circuit according to the invention.

This switch is controlled through a control terminal 16. The divider by two 15 receives the frame retrace RT and supplies a signal at half the frequency (double period). This signal is sent, on the one hand, to the selection circuit 11 for determining its operation sequence at half the frequency of the frame retrace signal RT, that is, the selection circuit will remain in a determined state (in the absence of inhibition) during the period of two frames and, on the other hand, to the control input 16 of switch 14. This control input is designed so that the switch is activated at the rate of the frame retrace signal RT. Thus, for example, from signal RT (see FIG. 2), the divider by two outputs at 16 a square wave signal such as represented in FIG. 2. The selection circuit 11 is controlled only by the rising or falling edges of the square pulses while switch 14 is controlled by the high and low levels.

Moreover, the invention provides the sending of the inhibition output IN of the identification circuit 10 not only to the selection circuit 11 but also to the dividing circuit 15.

FIG. 2 shows an example of an operation cycle of the circuit according to the invention. During the first two frames, the selection circuit is configured so as to position the identification circuit in the SECAM standard search mode. During the first frame, the switch is connected to the S-VHS input and, during the following frame, to the CVBS input. If, during the first frame, a SECAM signal is identified on the S-VHS input, the search cycle stops, signal IN inhibiting the selection and dividing by two circuits. If no signal has been identified during the first two frames, the selection circuit positions the identification circuit in PAL standard search mode and the S-VHS and CVBS inputs are examined again. The operation is the same for the NTSC standard and the cycle is repeated until there is an identification.

It will be noted that the above described circuit is a priority circuit. In fact, if signals simultaneously occur on the CVBS and S-VHS inputs, the circuit is first positioned on the S-VHS input and will stop on this standard if a video tape recorder is connected. If it is desired to receive antenna signals, the operation of the video tape recorder has to be interrupted.

An advantage of the circuit according to the invention is that it is particularly simple and essentially uses preexisting components easily available on the market.

We claim:

1. An automatic connection circuit on either of the two input terminals of a TV set, each of these inputs receiving video signals according to one of several standards, comprising a standard identification circuit and a selection circuit for controlling the identification circuit, the identification circuit sending an inhibition signal (IN) to the selection circuit when it has detected a signal corresponding to the standard type for which it is selected, further comprising:
   a switch, the first terminal of which is connected to the input of the identification circuit and the second terminal of which is connected to either of the input terminals by the action of a control signal, and
   a divider receiving a periodic signal and providing a signal for controlling the selection circuit according to a first period and the switch according to a half period, the operation of this divider being inhibited by said inhibition signal.

2. An automatic connection circuit according to claim 1, wherein the signal sent to the divider is a TV frame retrace signal (RT).

3. An automatic connection circuit according to claim 1, wherein the first input terminal is the antenna input terminal (CVBS) and the second input terminal is a S-VHS terminal.

* * * * *